United States Patent [19]

Palmer

[11] Patent Number: 4,845,152

[45] Date of Patent: Jul. 4, 1989

[54] TAPE JOINT COMPOUNDS UTILIZING STARCH STABILIZED EMULSIONS AS BINDERS

[75] Inventor: Joseph G. Palmer, Westfield, N.J.

[73] Assignee: National Starch and Chemical Corporation, Bridgewater, N.J.

[21] Appl. No.: 215,192

[22] Filed: Jul. 5, 1988

Related U.S. Application Data

[63] Continuation-in-part of Ser. No. 861,800, May 12, 1986, abandoned.

[51] Int. Cl.$^4$ .................... C08L 1/28; C08F 210/02
[52] U.S. Cl. ...................... 524/734; 524/50; 524/51; 524/52; 524/53; 524/423; 524/425; 524/445; 524/449; 524/492; 524/732
[58] Field of Search .......... 524/47, 50, 51, 52, 524/53, 423, 425, 445, 449, 492, 732, 734; 526/238.22

[56] References Cited

U.S. PATENT DOCUMENTS

| | | | |
|---|---|---|---|
| Re. 28,809 | 5/1976 | Tessler | 536/110 |
| 2,661,349 | 12/1953 | Caldwell et al. | 536/63 |
| 2,802,000 | 8/1957 | Caldwell et al. | 536/111 |
| 2,813,093 | 11/1957 | Caldwell et al. | 536/50 |
| 2,876,217 | 3/1959 | Paschall | 536/50 |
| 3,001,957 | 9/1961 | Kray et al. | 524/734 |
| 3,380,851 | 4/1968 | Lindemann et al. | 428/283 |
| 3,411,926 | 11/1968 | Gogek et al. | 106/210 |
| 3,632,535 | 1/1972 | Gramora et al. | 524/734 |
| 3,708,388 | 1/1973 | Lindemann et al. | 428/246 |
| 3,720,663 | 3/1973 | Tessler | 526/106 |
| 3,867,335 | 2/1975 | Reed et al. | 524/425 |
| 3,891,453 | 6/1975 | Williams | 106/85 |
| 3,992,432 | 11/1976 | Napler et al. | 558/544 |
| 4,020,272 | 4/1977 | Tessler | 536/110 |
| 4,287,103 | 9/1981 | Francis et al. | 524/47 |
| 4,454,267 | 6/1984 | Williams | 524/43 |
| 4,532,295 | 7/1985 | Brabetz et al. | 524/827 |

FOREIGN PATENT DOCUMENTS

| | | |
|---|---|---|
| 0021542 | 1/1981 | European Pat. Off. |
| 3323804A1 | 7/1983 | Fed. Rep. of Germany |
| 51-540 | 10/1976 | Japan |

*Primary Examiner*—Morton Foelak
*Assistant Examiner*—Nathan M. Nutter
*Attorney, Agent, or Firm*—Ellen T. Dec; Edwin M. Szala

[57] ABSTRACT

Tape joint compounds are prepared using as binders therefor vinyl ester polymers prepared by conventional emulsion polymerization techniques employing, as the stabilizer therein, an acid converted or enzyme modified starch having a water fluidity of 10 to 85.

21 Claims, No Drawings

TAPE JOINT COMPOUNDS UTILIZING STARCH STABILIZED EMULSIONS AS BINDERS

BACKGROUND OF THE INVENTION

This is a continuation-in-part of U.S. patent application Ser. No. 861,800, filed May 12, 1986 now abandoned.

The present invention is directed to tape joint compounds or cements with improved workability utilizing, as a binder therein, starch stabilized vinyl acetate emulsions.

Tape joint cements are used in the application of wallboard to fill the spaces between adjoining boards so as to provide a smooth seamless surface. The same joint compounds are used to cover the nails or other fasteners which affix the wallboard panel to its support elements so as to conceal the nail head and impart a continuously smooth appearance to the board.

For satisfactory use in these applications, the joint compound must possess a variety of properties. In its dried form, it must be durable and resist cracking for an extended period of time. It must also receive paint or wallpaper in substantially the same way as the wallboard with which it is used. Also, the joint composition must be compatible with the materials with which it makes contact, for example, the paper facing of the wallboard, metallic fasteners, and reinforcing tape. The composition should also have good workability, that is, it should be capable of being shaped easily into a smooth and continuous or unbroken film using conventional tools, such as trowels. For this purpose, the cohesiveness of the wet paste-like composition should be such that it has little or no tendency to be pulled apart as the blade is used to spread and smooth the composition. Also, the composition should be non-leveling, that is, it should not run off the tool during application nor flow or sag from the wall or ceiling after application. It is also important that the composition have good water-retention properties so that when it is applied to the dry paper cover of the wallboard, the water in the composition resists being absorbed by the paper from the time the composition is applied until the applicator is finished working it.

Tape joint cements are marketed in two forms, a "ready-mix" which is a finished formulation needing only stirring before application and as a "dry-mix" which is in the form of a dry free-flowing powder to which water is added and stirred until a workable consistency is attained. In either form, the essential components are a major proportion of an inert filler, such as, for example, calcium carbonate, clay, mica, silica, asbestos, and the like, and a minor proportion of a binder which serves to hold the cement together and prevent crumbling. The binder also adhesively bonds the cement to the wallboard and secure the applied tape thereto.

Binders employed in conventional tape joint formulations have generally been based on emulsions of vinyl acetate homo- or copolymers which were stabilized with hydroxyethyl cellulose, however, the resultant tape joint cements have been somewhat deficient with respect to workability (trowelability).

SUMMARY OF THE INVENTION

I have now found that binders prepared from aqueous emulsions of vinyl acetate homo- or copolymers which have been polymerized in the presence of acid converted or enzyme modified starches as stabilizers provide tape joint compounds of improved workability in addition to offering significant economic advantages.

Thus, the present invention is directed to tape joint cement compositions comprising a solid filler and, as a binder therefor, 1 to 12% based on dry weight of a homo- or copolymer of vinyl acetate which has been emulsion polymerized using an acid converted or enzyme modified starch of water fluidity 10 to 85 as a stabilizer.

The joint cement may be supplied in aqueous form using the vinyl acetate emulsion directly or the starch stabilized vinyl acetate emulsion may be spray dried and added, in that form, to the binder to provide a dry adhesive. In addition, the conventional joint composition may also include a bodying agent and one or more of the following: bulking agent; water retention agent; anti-crack agent; defoaming agent; and preservative.

DETAILED DESCRIPTION OF THE PREFERRED EMBODIMENTS

The polyvinyl ester emulsions utilized herein may be prepared by the emulsion polymerization of suitable vinyl ester monomers and polymerizable comonomers using as a stabilizer therefor 1–10% on the weight of total monomer of a dispersed or dissolved acid converted or enzyme modified starch having a water fluidity of 10 to 85.

The applicable converted or modified starch as may be obtained from starch derived from a variety of plant sources including waxy maize starch, corn starch, tapioca starch, potato starch, wheat starch, rice starch and sago. The preferred starch sources are those are those high in amylopectin such as waxy maize and tapioca. The starches are degraded or converted by acid hydrolysis or enzyme modification to a fluidity range of 10 to 85, preferably 30 to 60. The converted starches may be used in as emulsion stabilizers herein however their performance is improved if they are chemically derivatized using modification techniques well known in the art.

The preferred derivatives are the alkenyl succinate starches which are prepared by the reaction of alkenyl-succinic anhydrides (ASA) with either granular or dispersed starches. The preparation of the ASA reagents and the resulting starch derivatives are described in U.S. Pat. No. 2,661,349. The general reaction between ASA reagents and starch may be depicted as follows:

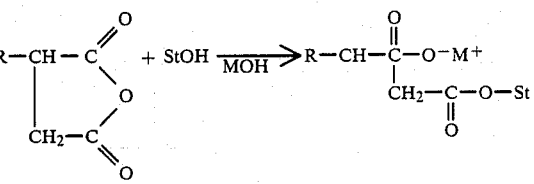

where St represents the polysaccharide fragment and M is a metal cation. The type of R group may be selected from branched or straight chain aliphatic substituents. R may thus be selected from the group consisting of $$R'\ CH{=}CH{-}CH_2{-}$$

-continued

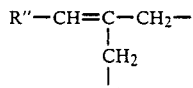

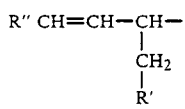

where R' and R" may be the same or different and are selected from the group consisting of $$CH_3-(CH_2-)-/n$$

where n = 1-20

The most common types of ASA reagents and the corresponding starch derivatives may be represented as follows:

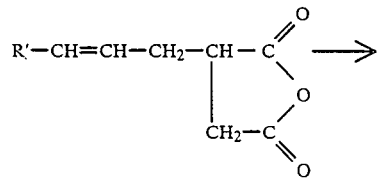 (I)

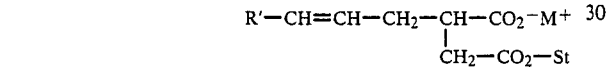

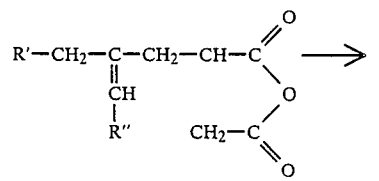 (II)

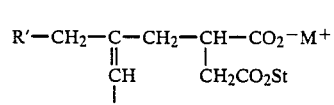

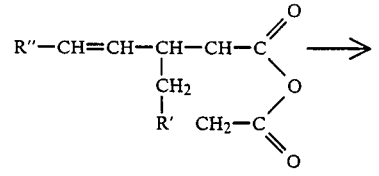 (III)

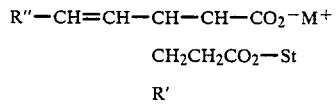

The range of ASA treatment is 1-10% ASA reagent of the weight of the starch. The preferred ASA derivatives are in the treatment range of 2-7.5% and are derived from Type III ASA where R'=CH$_3$-and R" is CH$_3$ (CH$_2$)—/n, n=7-9; and from Type I reagent where R'=CH$_3$—(CH$_2$)—/n, n=5-9.

Other derivatizing reactions useful herein involve the etherifiation with reagent described in U.S. Pat. No. 2,876,217 (issued on March 3, 1959 to E. Paschall) comprising the reaction product of an epihalohydrin with a tertiary amine having the structure

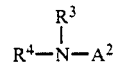

wherein $R^3$ and $R^4$ are $C_1$-$C_4$ alkyl and $A^2$ comprises a hydrocarbon chain of at least 5, preferably 5 to 14, carbon atoms.

Another suitable class of reagents for preparing derivatives useful herein include the imidazolides or N,N'-disubstituted imidazolium salts of carboxylic or sulfonic acids such as those described in U.S. Re. 28,809 (issued May 11, 1976 to M. Tessler) which is a reissue of U.S. Pat. No. 3,720,663 (issued on March 13, 1973 to M. Tessler) and U.S. Pat. No. 4,020,272 (issued April 26, 1977 to M. Tessler) having the general formula

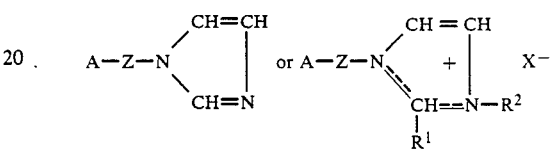

wherein Z is

or —SO$_2$—, A comprises a hydrocarbon chain of at least 5, preferably 5 to 14, carbon atoms, $R^1$ is H or $C_1$-$C_4$ alkyl, $R^2$ is $C_1$-$C_4$ alkyl, and $X^-$ is an anion.

Another suitable class of reagents useful herein include substituted cyclic dicarboxylic acid anhydrides such as those described in U.S. Pat. No. 2,661,349 (issued on Dec. 1, 1953 to Caldwell et al.) having the structure

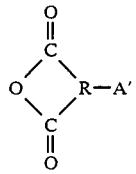

wherein R is a dimethylene or trimethylene radical and A' comprises a hydrocarbon chain of at least 5, preferably 5-14, carbon atoms. The substituted cyclic dicarboxylic acid anhydrides falling within the above structural formula are the substituted succinic and glutaric acid anhydrides. In addition to the hydrocarbon chain substituent other substituent groups such as sulfonic acid or lower alkyl groups which would not affect sizing performance may be present.

Also useful herein are derivatives prepared by reactions with alkylene oxides such as propylene oxide or ethylene oxide using procedures taught, for example, in U.S. Patent No. 2,802,000 issued Aug. 6, 1957 to C.G. Caldwell et al., as well as those prepared by reaction with aminoalkyl chlorides such as dimethylaninoethyl chloride as taught in U.S. Pat. No. 2,813,093 issued Nov. 12, 1957 to C. G. Caldwell, et al.

The starch etherification or esterification reactions may be conducted by a number of techniques known in the art and discussed in the literature employing, for example, an aqueous reaction medium, an organic solvent medium, or a dry heat reaction technique. See, for example R. L. Whistler, Methods in Carbohydrate Chemistry, Vol. IV, 1964, pp. 279-311; R. L. Whistler et al., Starch: Chemistry and Technology, Second Edition, 1984, pp. 311-366; and R. Davidson and N. Sittig, Water-Soluble Resins, 2nd Ed., 1968, Chapter 2. The starch derivatives herein are preferably prepared employing an aqueous reaction medium at temperatures between 20° and 45° C.

The starch derivatives may also be co-derivatized with other etherifying and esterifying reagents known to those skilled in the art. Examples of co-derivatization include acetylation, hydroxyalkylation, carboxymethylation, sulfoalkylation, and sulfosuccinoylation.

For use herein, the starch derivatives may be produced either in gelatinized or ungelatinized form. The advantage of having the derivative in ungelatinized form is that it may be filtered, washed, dried and conveyed to the mill in the form of a dry powder.

It will be recognized that there is a wide design latitude in utilizing these starches or starch derivatives as protective colloids in place of hydroxyethylcellulose or polyvinyl alcohol. Thus, the molecular weight of the starch may be varied to provide certain viscosity effects in the emulsion; the particular starch and amount thereof can be varied to provide degrees of emulsification capability which will impact the particle size of the emulsion and the rate of polymerization. Further, the plant source from which the starch is derived as well as any ester or ether derivatization may be varied to produce certain rheological properties in the final emulsion.

The primary monomer constituent used in the practice of this invention is vinyl acetate and the emulsions of this invention are derived from polymers containing at least 50% by weight of vinyl acetate. The vinyl acetate may be copolymerizable with any conventionally employed comonomers. Suitable comonomers include those selected from the class of ethylene; vinyl esters of aliphatic carboxylic acids containing 3-20 carbon atoms; dialkyl esters of maleic and fumaric acid containing 1-8 carbon atoms in each alkyl group; and $C_1$-$C_8$ alkyl acrylates and methacrylates. These comonomers may be present in the emulsion copolymers at levels up to 50% by weight of the total polymer composition.

The emulsions are prepared using conventional polymerization procedures wherein the monomers are interpolymerized in an aqueous medium in the presence of the acid converted starch using a free-radical catalyst, the aqueous system being maintained by a suitable buffering agent, if necessary, at a pH of 2 to 7. If a batch process is used, the vinyl acetate and any optional monomers are suspended in water and are thoroughly agitated while the vinyl acetate is gradually heated to polymerization temperature. The homogenization period is followed by a polymerization period during which the catalyst, which consists of a main catalyst or initiator, and may include an activator, is added incrementally or continuously. If the slow addition procedure is employed, the vinyl acetate and any optional comonomers are added gradually throughout the polymerization reaction. In either case, the polymerization is performed at conventional temperatures from about 70° to 225° F., preferably from 120° to 175° F., for sufficient time to achieve a low monomer content, e.g. from 0.5 to about 10 hours, preferably from 2 to about 6 hours, to produce a latex having less than 1.5 percent preferably less than 0.5 weight percent free monomer.

In the case of vinyl ester interpolymers containing ethylene, the polymerization procedure is similar to that discussed above except that it is carried out under pressure of 10 to about 130 atmospheres using polymerization procedures taught, for example, in U.S. Pat. Nos. 3,708,388; 3,404,112; 3,714,099 and 4,164,488. In these cases, the ethylene content of the interpolymer depends on the ethylene content of the aqueous polymerization medium. Factors which control the ethylene content of the polymerization medium include the partial pressure of ethylene in the vapor phase over the medium, the temperature of polymerization and the degree of mixing between the vapor phase and the liquid medium. Generally, the polymerization is performed at temperatures from 120° to 175° F. and, at these temperatures, ethylene partial pressures from 50 to 1,500, preferably from 250 to 1,000 psig, are sufficient to incorporate from 1 to 30, preferably from 5 to 25, weight percent ethylene in the polymer. The reaction medium is preferably agitated with a stirrer, however, other agitation can be used as sparging the liquid with recirculated ethylene from the vapor phase. In the preferred procedure, the ethylene partial pressure is maintained constant throughout the polymerization period so that this monomer is continuously supplied at a constant rate.

The polymerization is typically initiated by a free radical initiator such as water soluble peracid or salt thereof, e.g., hydrogen peroxide, peracetic acid, persulfuric acid or the ammonium and alkali metal salts thereof, e.g, ammonium persulfate, sodium peracetate, lithium persulfate, potassium persulfate, sodium persulfate, etc. Alternatively, organic peroxides such as benzoyl peroxide, t-butyl hydroperoxide, etc., may also be employed. A suitable concentration of the initiator is from 0.05 to 5.0 weight percent and preferably from 0.1 to 3 weight percent.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite and pyrosulfite, e.g., sodium metabisulfite, sodium formaldehyde sulfoxylate, potassium metabisulfite, sodium pyrosulfite, etc. The amount of reducing agent can be employed throughout the copolymerization generally varies from about 0.1 to 3 weight percent of the amount of polymer.

The acid converted or enzyme modified starch may be used in the form of a cold water soluble powder in which case it is added in powder form directly to the polymerization reactor. Alternatively, the starch may be used in granular form in which case it is generally slurried in water at a 10 to 40% solids level, jet cooked or pressure-batch-cooked and added to as a dispersion to the reactor. The starch is added at a total solids level of from about 1 to 10% by weight of the monomers, with the higher levels being required if batch polymerization procedures are employed. Amounts in excess of 10% could be used with the maximum amount dependent upon the the desired viscosity, particle size and end use of the emulsion.

The starch used in the polymerization can also be added, in its entirety, to the initial charge or a portion of the emulsifier, e.g. from 25 to 90 percent thereof, can be added continuously or intermittently during polymerization.

The latices are produced and used at relatively high solids contents, e.g., between 35 and 70%, although they may be diluted with water if desired. The preferred latices will contain from 40 to 60, and, most preferred, from 50 to about 60 weight percent solids.

The binders described herein are used in the tape joint compounds at levels of about 1 to 12% by dry weight, preferably 2 to 4%. In addition to the starch stabilized vinyl acetate binder, minor amounts of other conventional binders may be employed.

The remaining components utilized in the tape joint cements of the invention are those conventional in the art.

The filler is a small particle size, inert solid which comprises the principal constituent of the composition in terms of mass and volume. It is recommended that either gypsum (calcium sulfate dihydrate) limestone, or mica be used as the filler because these materials possess the properties desired of a filler and they are relatively inexpensive. Examples of other materials which can be used as a filler are clay and silica flour. The filler is generally used in these cements in amounts of about 25 to 99% by dry weight, preferably 65 to 90%.

Bulking agents, i.e., materials of relatively low density (i.e., less than 35 pounds/cubic foot) which impart high volume to the compositions without adding much weight are also often employed at levels of about 5 to 50% by dry weight, preferably 7 to 25%. Examples of bulking agents that can be used a diatomaceous earth, aluminum silicate, talc, and calcium silicate.

Optionally, but preferably, the composition includes a water-retention agent which functions to retard evaporation of water and to keep the water constituent from being absorbed in a blotter-like effect by the paper facing of the wallboard core. The water retention agent can function also to thicken the composition. Examples of materials which function as water retention agent are methyl cellulose, hydroxy ethyl cellulose, guar gum derivatives, alginates and certain starches.

In addition to the aforementioned, the filler composition can include other materials which are used to obtain special effects. The following are exemplary: a preservative which functions to prolong shelf-life of the composition by retarding or preventing the growth of microorganisms, for example, phenyl mercuric acetate, and 1,2-benzisothiazoline-3-one; a defoaming agent, for example, a mixture of polyglycol and fatty acid type surface active agents; a buffering agent for the purpose of stabilizing pH, for example, soda ash, and magnesium oxide.

The following examples are given to illustrate the present invention, but it will be understood that they are intended to be illustrative only and not limitative of the invention. In the examples, all parts are by weight unless otherwise indicated.

Water fluidity (WF) is a measure of the degree of degradation of the starch and is measured using a Thomas Rotational Shear-Type Viscometer (manufactured by Arthur H. Thomas Co., Philadelphia, PA 19106) in accordance with standard procedures such as are disclosed in U.S. Pat. No. 4,499,116.

The following examples illustrate preparation of the starch stabilized vinyl acetate binders used herein.

EXAMPLE 1

This example describes the preparation of a starch stabilized polyvinylacetate emulsion using octenylsuccinic anhydride treated starch as a protective colloid and a slow-addition polymerization procedure. A reactor with four-neck flask was fitted with a thermometer, condenser, agitator, subsurface nitrogen purge, and suitable addition funnels. The following charges were prepared:

(A) 61.67 parts water, 5 parts 3% octenylsuccinic anhydride (OSA) treated waxy-maize starch at 45 water fluidity (WF), 0.125 part 25% sodium hydroxide solution, 0.6 part sodium bicarbonate, and 0.6 part sodium persulfate;

(B) 19 parts vinyl acetate, 1.0 parts dioctyl maleate;

(C) 8.33 parts water, 0.025 part sodium persulfate, and 0.583 part t-butyl hydrogen peroxide;

(D) 8.33 parts water, 0.5 part sodium formaldehyde sulfoxylate, and 0.125 part sodium bicarbonate;

(E) 80 parts vinyl acetate.

A dispersion of initial charge A was formed in the reactor. Agitation was started and charge B was added. The mixture was heated to 50° C. and purged with nitrogen for 15 minutes. Charges C and D were slow-added over 4.5 hours. Five minutes after initiation, temperature was raised to 7520 C. over 30 minutes. Charge E was then slow-added over 3 hours. The mixture was held at 78°–80° C. until charge of the initiators was completed, then cooled and discharged. The emulsion was designated Emulsion 1.

The procedure was then repeated using varying parts of the OSA starch, different starch bases and different levels of comonomers as follows:

| Emulsion | Starch | Amount Starch | Treatment Level of Starch |
|---|---|---|---|
| 2 | Waxy Maize | 6 parts | 3% OSA |
| 3 | Tapioca* | 5 parts | 5% OSA |
| 4** | Tapioca* | 6 parts | 5% OSA |

*41.5 WF
**This emulsion was also modified to contain 97% vinyl acetate and 3% dioctyl maleate.

EXAMPLE 2

A similar procedure to that described in Example 1 was used to prepare the following vinyl acetate homopolymer emulsions.

| Emulsion | Starch | Amount Starch | Treatment Level |
|---|---|---|---|
| 5 | Waxy Maize | 6.0 | 3% OSA |
| 6 | Waxy Maize | 6.5 | 3% OSA |
| 7 | Tapioca | 6.0 | 5% OSA |
| 8 | Tapioca | 6.5 | 3% OSA |

EXAMPLE 3

This example illustrates the use of a slow addition polymerization procedure in order to prepare an ethylene vinyl acetate emulsion polymer.

A 10 liter autoclave equipped with heating/cooling, variable rate stirrer and means of dosing monomers, initiators and pressurizing with ethylene was employed.

To the autoclave were added 280g of 5% OSA tapioca starch (45 WF) dispersed in 2360g of water, 1.25g sodium hydroxide and 16g sodium bicarbonate in 180g water and 2g sodium persulphate in 60g water. To this dispersion was then added 600 g of vinyl acetate and the contents were then pressurized with ethylene to 450 psi and equilibration carried out for 15 minutes. At the end of the equilibration period solutions of 1 g sodium persulphate and 17 g tertiary butyl hydroperoxide in 225 g of water and 5 g sodium bicarbonate and 20 g sodium formaldehyde sulfoxylate in 230 g of water were metered in incrementally over 5 hrs. The contents were allowed to reach 75° C. and then 2600 g of vinyl acetate were also metered in over a 4 hr. period. At 75° C., ethylene pressure was increased to 750 psi and maintained at this level during the vinyl acetate addition period. At completion of the initiator solution additions, the contents were cooled to 60° C. and then discharged into a 30 liter expansion vessel to de-gas residual ethylene from the system. The emulsion was designated Emulsion 9. The procedure described above was repeated using 200 g of 5% OSA tapioca starch (45 WF). The emulsion was designated Emulsion 10.

EXAMPLE 4

The following emulsions were prepared as described in Example 1.

| Emulsion | Monomer Composition | Starch | Amount Starch | Treatment |
|---|---|---|---|---|
| 11 | 97VA/3DOM | Tapioca | 5 | 3% OSA/ 5% CSPA |
| 12 | 97VA/3DOM | Hybrid corn | 4 | 5% OSA/ 6% PO |
| 13 | 97VA/3DOM | Tapioca | 6 | 10% CSPA |
| 14 | 99VA/1DOM | Waxy maize | 8 | None |
| 15 | 99VA/1DOM | Waxy maize | 10 | None |

Hybrid corn containing 50% amylose
VA = vinyl acetate; DOM-dioctyl maleate
CSPA = chlorosulfopropionic acid
PO = propylene oxide Tape joint compounds were prepared using the emulsions described above in the following formulations with the components added with mixing in the groups shown:

| Raw Material | Quantity (By Weight) |
|---|---|
| Water | (to total 1000 grams) |
| Proxel GXL (preservative) | 0.2 |
| Colloid 643 (defoamer) | 0.4 |
| MICA 80 SF (filler) | 35.9 |
| Attagel X-2059 (attapulgite clay-thickener) | 16.7 |
| Natrovis 409 (cellulosic-thickener) | 4.8 |
| Water | 23.9 |
| Georgia White #9 (calcium carbonate-filler) | 388.6 |
| Propylene Glycol | 2.4 |
| Polyox WSR-301 (polyglycol) | 0.1 |
| Water | 1.0 |
| Georgia White #9 | 209.2 |
| Binder Emulsion | varied |
| | 1,000.00 |

The amount of binder was varied between 2 and 3% solids on the dry eight of the filler. The resulting tape joint compounds were tested using procedures described below and compared against conventionally employed binders.

Adhesion Test: The adhesion test is run on a composite of paper type and joint compound that has been applied to a sheet of gypsum board.

A small quantity of joint compound is applied to a gypsum board that has been conditioned at 22° C./50% RH. A tape is laid on the joint compound and pressed into place with several passes of a taping knife. Some excess joint compound is spread over the surface of the tape to insure uniform coverage and smoothness. This composite is placed in a conditioning chamber set at 22° C./50% RH and allowed to dry for 24 hours. The boards are then removed from the conditioning room. An "X" is cut through the joint compound insuring that the tape is cut completely across. Edges of the tape at the cross of the "X" are then pulled back by hand and the adhesion is rated by the resistance of the tape to peeling and by a the extent of fiber tear of the tape.

Excellent—tape cannot be pulled from the center of "X" without significant resistance and delamination of the paper tape, or destruction of the gypsum board surface.

Good—the tape can be peeled back with some resistance and significant amount of fiber tear throughout most of the tape.

Fair—the tape can be peeled back with some resistance and spotty areas of fiber tear of the tape.

Poor—the tape can be peeled back without minimal resistance and essentially no fiber tear of the tape.

A rating of "good" is the minimal acceptable rating for a joint compound under these testing conditions.

Workability: is a subjective rating of the joint compound's ease of application. Joint compounds that resist spreading when applied using a broad blade knife or spatula are undesirable. Therefore, the best compounds have a high static viscosity but thin down very quickly under shear. The rheology should be short and "buttery". There should be a degree of surface "slip" when a taping knife is run over the surface of the compound with light pressure.

There is no instrument that can adequately assess all the characteristics of joint compound workability, hence, it is rated by the workers as they apply the compound to a gypsum board using a broad bladed knife, trowel or spatula.

Excellent—the compound has a buttery, short consistency, can be spread easily and has little "drag" for smoothing the surface.

Good—the compound has a buttery consistency but offers some resistance to spreading or smoothing.

Fair—the compound may be judged "heavy" or "thick" but could be spread and smoothed with some resistance.

Poor—the compound has a long, stringy consistency and is difficult to spread or smooth.

The results follow:

| | | Test Results | |
|---|---|---|---|
| Emulsion | % Binder | Adhesion | Workability |
| 1 | 3.0 | excellent | excellent |
| 2 | 3.0 | excellent | excellent |
| 3 | 3.0 | excellent | good/excellent |
| 4 | 3.0 | excellent | excellent |
| Control 1 | 3.0 | excellent | good/excellent |
| 5 | 2.5 | excellent | excellent |
| 6 | 2.5 | excellent | excellent |
| 7 | 2.5 | excellent | good/excellent |
| 8 | 2.5 | excellent | excellent |
| Control 1 | 2.5 | good/excellent | good |
| 9 | 2.0 | excellent | good/excellent |
| 10 | 2.0 | excellent | excellent |
| Control 2 | 2.0 | excellent | fair/good |
| 11 | 2.5 | excellent | good |
| 12 | 2.5 | excellent | good |
| 13 | 2.5 | good/excellent | good |
| 14 | 2.5 | good | good |
| 15 | 2.5 | excellent | good |
| Control 1 | 2.5 | excellent | good/excellent |

Control 1 = HEC stabilized vinyl acetate homopolymer
Control 2 = Polyvinyl alcohol stabilized ethylene vinyl acetate In order to further illustrate the differences in behavior between tape joint compositions containing polymers prepared with various stabilization systems, a series of tape joint compounds were prepared and were tested for rheological properties using a Ferranti—Shirley Viscometer. This viscometer is utilized to measure the relationship between the rate of shear and the shear stress. In general, fluids possess not one viscosity but rather a range of viscosity values depending on the rate of shear. For Newtonian fluids, the graph of shear stress against rate of shear is linear and passes through the origin; however, for non-Newtonian fluids (such as tape joint compounds), suspended particles interfere with the free-flow of the dispersion medium to a degree that is dependent on the rate of shear. Non-Newtonian fluids exhibit several types of flow and it is the thixotropic-type flow which is of most concern in tape joint formulations.

Thixotropy may be defined as a reversible, time-dependent decrease of flow resistance resulting from the application or increase of shear. Many particle suspensions, such as tape joint compounds exhibit thixotropic properties. Thixotropes flow more easily with time when sheared at a given rate until an equilibrium level is reached; increasing shear rate will cause a further decrease in the apparent viscosity. If shear stress is removed or reduced the material recovers toward its initial viscosity level. A finite time is always required for the structure to reform completely.

A common method of depicting flow behavior of thixotropes is by "up" and "down" shear stress vs rate of shear curves. The shear rate is increased to a maximum in predetermined increments and then decreased to zero, with a constant time interval between readings. Plotting such data provides a hysteresis type loop and thixotropic behavior may be assessed from the area of the hysteresis loop.

Three binder emulsions used in this experiment were prepared following substantially the procedure of Example 1. Binder A was prepared with 3% OSA treated waxy-maize starch at 45 WF; Binder B used polyvinyl alcohol and Binder C hydroxyethyl cellulose. In all cases, 10 (based on solids of polymer) dibutyl phthalate plasticizer was added to the emulsion upon completion of the polymerization reaction.

The resultant binders were then used to prepare tape joint compounds using the following formula:

| Ingredient | Description | Quantity |
| --- | --- | --- |
| Water | | 295.0 |
| Proxel GXL | Preservative | 0.6 |
| Colloids 643 | Antifoam | 0.4 |
| Methocel 90HG | Hydroxypropyl Methyl Cellulose (thickener) | 6.5 |
| Attagel 40 | Attapulgite Clay (thixotrope) | 17.0 |
| Mica 80SP | Dry Ground Mica (filler) | 42.0 |
| Propyleneglycol | Humectant | 3.5 |
| Georgia White #9 | Calcium Carbonate (filler) | 595.0 |
| Emulsion Polymer | Binder | 40.0 |
| (58% solids) | | 1000.0 |

The tape joint compounds described above were tested on the Ferranti-Shirley viscometer using a medium size (210 micron) truncated cone. An X-Y Chart Recorder was used to plot the shear stress of the fluid (X axis) and the rate of shear (Y axis) as the rate of shear was varied from zero to a maximum and back to zero. The apparent viscosity at any rate of shear is the inverse of the slope of the curve at that rate of shear.

A thixotropy index which represents a ratio of viscosities at low shear (high viscosity) over high shear (low viscosity) was calculated by dividing the static viscosity (i.e., viscosity at the time the machine is turned on) by the viscosity at maximum shear (200 ppm). A second calculation was made to determine an index at 100 rpm.

The indices for the three tape joint compounds at 200 RPM and 100 RPM are shown below:

| | | Thixotropy Index | |
| --- | --- | --- | --- |
| Binder | Emulsifier | Static/200 RPM | Static/100 RPM |
| A | Starch | 4.7 | 2.0 |
| B | polyvinyl alcohol | 3.8 | 1.7 |
| C | hydroxyethylcellulose | 6.0 | 2.2 |

As the results observed above illustrate, the particular emulsifier used to prepare the polymer has a major effect upon the rheological properties and behavior of the tape joint compounds prepared therefrom.

The results observed above are consistent with those shown previously where the starch stabilized emulsions were shown to provide properties only slightly poorer than the more expensive hydroxyethyl cellulose stabilized systems and better than the polyvinyl alcohol stabilized systems, the latter being the most generally employed emulsifiers for polyvinyl acetate polymers.

Following the procedures described above, comparable results would be expected using other unmodified acid converted or enzyme modified starches, as well as, acid converted or enzyme converted starches treated with other derivatizing agents. The above examples clearly demonstrate that excellent tape joint compounds can be prepared using as binders acid converted or enzyme modified starch stabilized vinyl acetate emulsions in accordance with the teachings of the present invention.

It will be apparent that various changes and modifications may be made in the embodiments of the invention described above, without departing from the scope of the invention, as defined in the appended claims, and it is intended therefore, that all matter contained in the foregoing description shall be interpreted as illustrative only and not as limitative of the invention.

We claim:

1. A tape joint compound comprising a solid filler and, as a binder therefor, 1 to 12% based on dry weight of a homo- or copolymer of vinyl acetate which has been emulsion polymerized using, as a stabilizer, 1 to 10% on the weight of the monomer of a dispersed or dissolved acid converted or enzyme modified starch having a water fluidity of 10 to 85.

2. The tape joint compound of claim 1 comprising an aqueous emulsion of the vinyl acetate homo- and copolymer and filler.

3. The tape joint compound of claim 1 in which the vinyl acetate homo- or copolymer emulsion is spray-dried and mixed in dry form with the filler.

4. The tape joint compound of claim 1 additionally containing at least one member selected from the group consisting of bulking agents, water retention agents, anti-crack agents, defoaming agents and preservatives.

5. The tape joint compound of claim 1 wherein the binder comprises a homopolymer of vinyl acetate.

6. The tape joint compound of claim 1 wherein the binder comprises a copolymer of vinyl acetate and a copolymerizable comonomer is selected from the group consisting of ethylene, vinyl esters of aliphatic carboxylic acids containing 3-20 carbon atoms, dialkyl esters of maleic and fumaric acid containing 1–8 carbon atoms in each alkyl group, and $C_1$–$C_8$ alkyl acrylates and methacrylates.

7. The tape joint compound of claim 1 wherein the binder comprises a copolymer of vinyl acetate and a $C_1$–$C_8$ alkyl acrylate or methacrylate.

8. The tape joint compound of claim 1 wherein the binder comprises copolymer of vinyl acetate and ethylene, the ethylene being present in a amount of 1 to 30% by weight of the copolymer.

9. The tape joint compound of claim 1 wherein the starch is selected from the group consisting of waxy maize, corn, tapioca, potato, wheat, rice and sago as well as the ether and ester derivatives thereof.

10. The tape joint compound of claim 9 wherein the starch is waxy maize or tapioca.

11. The tape joint compound of claim 1 wherein the starch has a water fluidity within the range of 30 to 60.

12. The tape joint compound of claim 1 wherein the starch is an ether or ester derivative.

13. The tape joint compound of claim 12, wherein the starch is an alkenyl succinate derivative selected from the group represented by the formulas:

$$R'-CH=CH-CH_2-CH(CH_2-CO_2-St)-CO_2^-M^+ \quad (I)$$

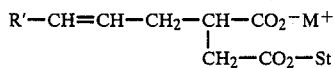

$$R''-CH=CH-CH(CH_2)(R')-CH-CO_2^-M^+,\ CH_2CO_2^-St \quad (III)$$

wherein St is the starch residue and R is selected from the group consisting of $$R'\ CH=CH-CH_2-$$

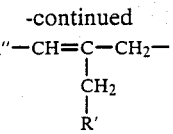

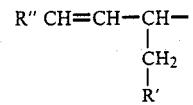

where R' and R" may be the same or different and are selected from the group consisting of:

$$CH_3-(CH_2-)-/n$$

where $n = 1-20$

14. The tape joint compound of claim 13, wherein the alkenylsuccinate treatment is 1 to 10% by weight of the starch.

15. The tape joint compound of claim 13 wherein the alkenylsuccinate-modified starch is Type III where R' is $CH_3$ and R" is $CH_3(CH_2)_n$ are n is 7 to 9 or of Type I where R' is $CH_3(CH_2)_n$ and n is 5 to 9.

16. The tape joint compound of claim 15, wherein the alkenyl-succinate-modified starch is an octenylsuccinate-modified starch.

17. The tape joint compound of claim 12 wherein the starch is derivatized with a imidazolide or N,N'-disubstituted imidazoline salt of carboxylic or sulfonic acid.

18. The tape joint compound of claim 12 wherein the starch is derivatized with a substituted cyclic dicarboxylic acid and anhydrides.

19. The tape joint compound of claim 12 wherein the starch is derivatized with an alkylene oxide.

20. The tape joint compound of claim 12 wherein the starch is derivatized with a reagent comprising the reaction product of an epihalohydrin with a tertiary amine having the structure $$R^4-N(R^3)-A^2$$

wherein $R^3$ and $R^4$ are $C_1$–$C_4$ alkyl and $A^2$ comprises a hydrocarbon chain of at least 5 carbon atoms.

21. The tape joint compound of claim 1 wherein the filler is selected from the group consisting of gypsum, limestone, mica, clay and silica flour.

* * * * *